(12) United States Patent
Shukla et al.

(10) Patent No.: US 10,979,954 B2
(45) Date of Patent: Apr. 13, 2021

(54) OPTIMIZING PRIVATE NETWORK DURING OFFLOAD FOR USER EQUIPMENT PERFORMANCE PARAMETERS

(71) Applicant: Cisco Technology, Inc., San Jose, CA (US)

(72) Inventors: Amitesh Shukla, San Ramon, CA (US); Manish Jhanji, Santa Clara, CA (US); Rakesh Mishra, San Ramon, CA (US); Satish Kumar Mandavilly, Milpitas, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/553,381

(22) Filed: Aug. 28, 2019

(65) Prior Publication Data
US 2021/0068025 A1 Mar. 4, 2021

(51) Int. Cl.
*H04W 36/22* (2009.01)
*H04W 28/06* (2009.01)
*H04W 28/08* (2009.01)
*H04W 24/10* (2009.01)
*H04W 24/02* (2009.01)
(Continued)

(52) U.S. Cl.
CPC ........... *H04W 36/22* (2013.01); *H04W 24/02* (2013.01); *H04W 24/10* (2013.01); *H04W 28/06* (2013.01); *H04W 28/08* (2013.01); *H04W 36/14* (2013.01); *H04W 48/18* (2013.01); *H04W 88/06* (2013.01)

(58) Field of Classification Search
CPC ..... H04W 36/22; H04W 36/14; H04W 24/10; H04W 24/02; H04W 48/18; H04W 88/06; H04W 28/08; H04W 28/06
See application file for complete search history.

(56) References Cited

U.S. PATENT DOCUMENTS 8,931,016 B2 1/2015 Hao et al.
9,532,261 B2 12/2016 Raleigh et al.
(Continued)

OTHER PUBLICATIONS

Baig, Ghufran et al., "Interference management for unlicensed users in shared CBRS spectrum", Proceedings of the 14th International Conference on emerging Networking EXperiments and Technologies, Dec. 4-7, 2018, https://doi.org/10.1145/3281411.3281417, 13 pages.

(Continued)

*Primary Examiner* — Steven H Nguyen
(74) *Attorney, Agent, or Firm* — Edell, Shapiro & Finnan, LLC (57) ABSTRACT

Methods are provided in which devices vulnerable to performance degradation during a network offload process are identified and handled accordingly. In these methods, a network controller obtains data associated with operational performance of devices in a radio network during one or more offload procedures in which the devices are to be transitioned off of the radio network. The network controller further analyzes the data to determine impact to at least one performance parameter of the devices during the one or more offload procedures, and during a subsequent offload procedure, the network controller orchestrates offloading of the devices according to the impact determined to the at least one performance parameter based on the analyzing.

20 Claims, 6 Drawing Sheets

(51) Int. Cl.
*H04W 48/18* (2009.01)
*H04W 36/14* (2009.01)
*H04W 88/06* (2009.01)

(56) References Cited

U.S. PATENT DOCUMENTS

| | | |
|---|---|---|
| 9,655,003 B2 | 5/2017 | Sivakumar et al. |
| 2013/0201842 A1* | 8/2013 | Chou .................... H04W 28/08 370/252 |
| 2015/0103648 A1* | 4/2015 | Chou .................... H04L 1/0026 370/230 |
| 2015/0119042 A1 | 4/2015 | Radulescu et al. |
| 2015/0282027 A1* | 10/2015 | Venkataraman .. H04W 28/0247 370/329 |

OTHER PUBLICATIONS

Ghai, Rajat et al., "CBRS Use-Cases With focus on Localized Indoor Mobile Access (LIMA), Mobility and Service Continuity", Oct. 22-25, 2018, 36 pages.

\* cited by examiner

OPTIMIZING PRIVATE NETWORK DURING OFFLOAD FOR USER EQUIPMENT PERFORMANCE PARAMETERS

TECHNICAL FIELD

The present disclosure relates to wireless radio access systems/networks.

BACKGROUND

Private Long Term Evolution (LTE)/Fifth Generation (5G) networks may be established in various frequency bands. In the United States, these private networks may use the Citizens Broadband Radio Service (CBRS) band. In particular, the Federal Communications Commission (FCC) in the United States allocated radio spectrum in the 3550-3700 megahertz (MHz) band (e.g., 3.5 gigahertz (GHz) band) to the CBRS for shared wireless broadband use by enterprises under certain sharing regulations. Enterprises can use this CBRS spectrum to set up their private networks and allow access to consumers and Internet of Things (IoT) devices. Under the FCC regulations, the private network deployments are subordinate users of this CBRS frequency and may be forced to offload its customer user and IoT devices when certain conditions occur. To continue the proliferation of the private network deployments in the CBRS frequency band, enterprises will need to ensure a certain quality of service to its customers and IoT devices in the case of interruption from higher priority users.

DESCRIPTION OF EXAMPLE EMBODIMENTS

Overview

Briefly, a method for gracefully offloading devices from a radio network is provided. The method includes obtaining data associated with operational performance of the devices in the radio network during one or more offload procedures in which the devices are to be transitioned off of the radio network. The method further includes analyzing the data to determine impact to at least one performance parameter of the devices during the one or more offload procedures. During a subsequent offload procedure, offloading of the devices from the private radio network is orchestrated according to the impact determined to the at least one performance parameter based on the analyzing.

Example Embodiments

Enterprises provide wireless radio network access for user devices and IoT devices (collectively referred to as user equipment (UE) devices). The UE devices may include but are not limited to a personal computer (PC) such as a desktop or a laptop, a consumer device such as a personal digital assistant (PDA) or a smart phone. The IoT devices may include medical equipment, smart appliances, commercial security systems, industrial systems, sensors, and so on. These are provided by way of an example and not by way of a limitation. The UE devices are connected to public network(s) such as Internet via various radio access networks such as Wi-Fi™ wireless local area networks (WLANs) and wireless wide area networks (WWANs), such as cellular networks (e.g., $3^{rd}$ generation (3G) networks, $4^{th}$ generation (4G) and $5^{th}$ generation (5G) networks).

One example of a private radio network is a CBRS based private network (a CBRS network) in the United States. The CBRS network is 150 MHz wide broadcast band of 3.5 GHz band (3550-3700 MHz frequency range). The CBRS network may provide services to many mission-critical devices and/or applications, including industrial IoT devices, robotics, life-sustaining medical equipment, and so on. The responsibility of providing appropriate quality of service to the UE devices falls on an enterprise deploying the CBRS network. In maintaining the necessary quality of service, the enterprises deploying CBRS networks need to consider interferences and/or interruptions from other users of the CBRS frequency band.

Figure 1:
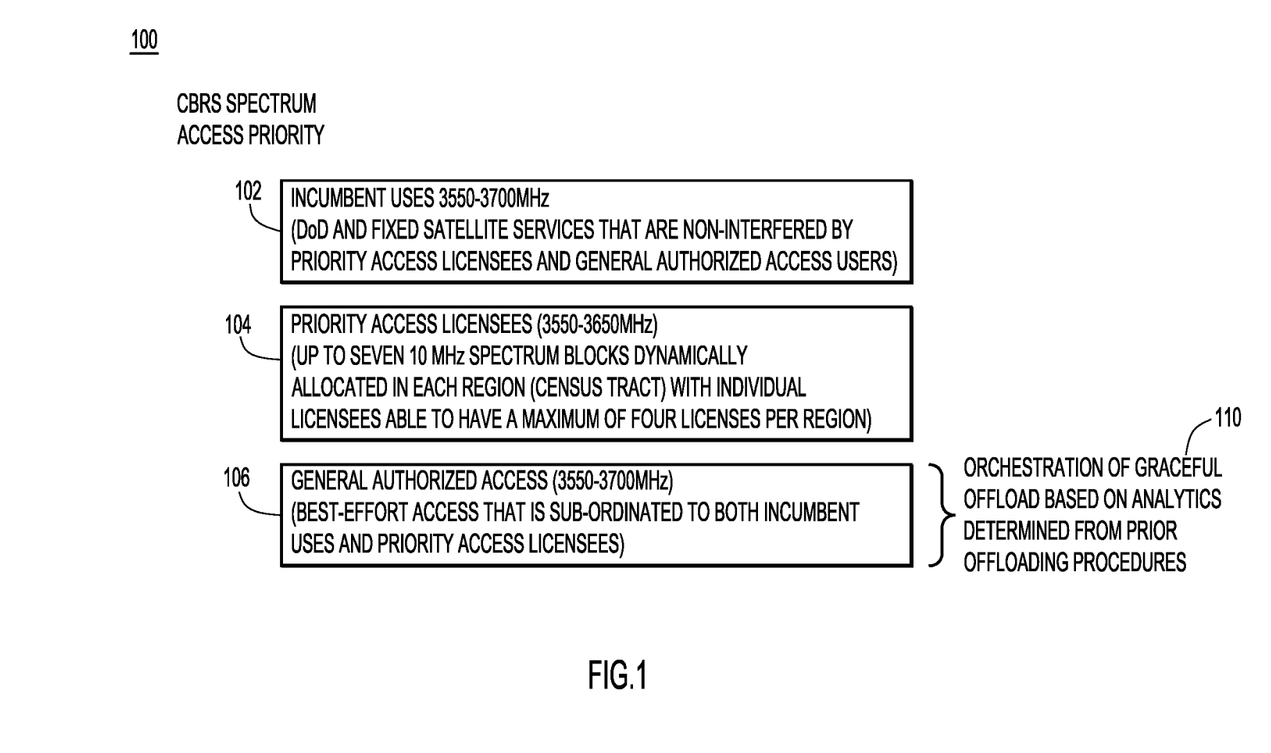
FIG. 1 illustrates a CBRS spectrum access priority, according to an example embodiment.

The CBRS network has a tier of users. FIG. 1 illustrates a diagram 100 depicting CBRS spectrum access priority, according to an example embodiment. In FIG. 1, there are three types of users: Tier 1 users (Incumbent Users) 102, Tier 2 users (Priority Access Licensees, PALs) 104, and Tier 3 users (General Authorized Access, GAA) 106.

Tier 1 users 102 have the highest priority and are super users in a sense that they have access to all allocated channels of the CBRS and take priority over all other users. Examples of the Tier 1 users 102 include but are not limited to equipment of the U.S. Department of Defense (navy ships and military radar) and fixed satellite service earth stations.

Tier 2 users 104 have a lower priority than the Tier 1 users 102, but a higher priority than the Tier 3 users 106. Tier 2 users 104 (PALs) are granted access in the 3550-3650 MHz band. Tier 2 users 104 are allowed to use a maximum of seven 10 MHz channels in a census tract or an area. No PAL licensee can take more than 4 PAL channels in a census tract. Tier 2 users 104 may license the PAL channels from the FCC in a limited geographic area. Examples of the Tier 2 users 104 include, but are not limited to, emergency services such as ambulances, fire department, and police.

Tier 3 users 106 (GAAs) have the lowest priority and are subordinate to both Tier 1 users 102 and Tier 2 users 104. Tier 3 users 106 are allowed access to all channels in the frequency bands 3550-3700 MHz but only the ones not being used by the higher priority users. A frequency band is dynamically allocated to Tier 3 users 106 so that they do not interfere with the Tier 1 users 102 and Tier 2 users 104. Since Tier 3 users 106 may be forced to vacate the CBRS network at any point in time, they only have best-effort access. In other words, Tier 3 users 106 may be forced to offload from the CBRS all of their UE devices to free the CBRS frequency band for higher priority users.

An offload process (offloading) is a process in which one of the Tier 3 users 106 (an enterprise which provides a private radio CBRS network) is forced to vacate a CBRS frequency band and move all of its devices to a different frequency or to a different radio access network, such as Wi-Fi network or a public cellular network. The FCC requires that Tier 3 users 106 offload the CBRS within 300 seconds or less after receiving a notification from a Spectrum Access System (SAS). According to an example embodiment, offloading is triggered by an enterprise receiving a notification to move from the CBRS frequency band and ends at a 300 sec mark or earlier, when all the UE devices of the enterprise are moved to a different network or frequency band and the enterprise notifies the SAS that offload is complete.

In an example embodiment, and as shown at 110 in FIG. 1, a system and a method are presented herein by which an enterprise (one of the Tier 3 users 106) offloads its UE devices gracefully, providing assured and deterministic performance parameters for the UE devices during the offload process. The system continues to provide uninterrupted or least disruptive service to UE devices executing mission-critical applications in case an interruption from a higher order entity (Tier 2 Users—PAL, Tier 1 Users—Incumbent Access) occurs. That is, UE devices that are vulnerable to degradation performance during the offload process are identified and handled accordingly. The system determines different needs of the UE devices (such as low latency and high throughput requirements). Due to varied requirements of the UE devices, the system implements a mechanism that handles these UE devices accordingly during the offload process. In short, UE devices of the enterprise which can potentially be interrupted or encounter performance impact during the offload process are identified and prioritized.

Figure 2:
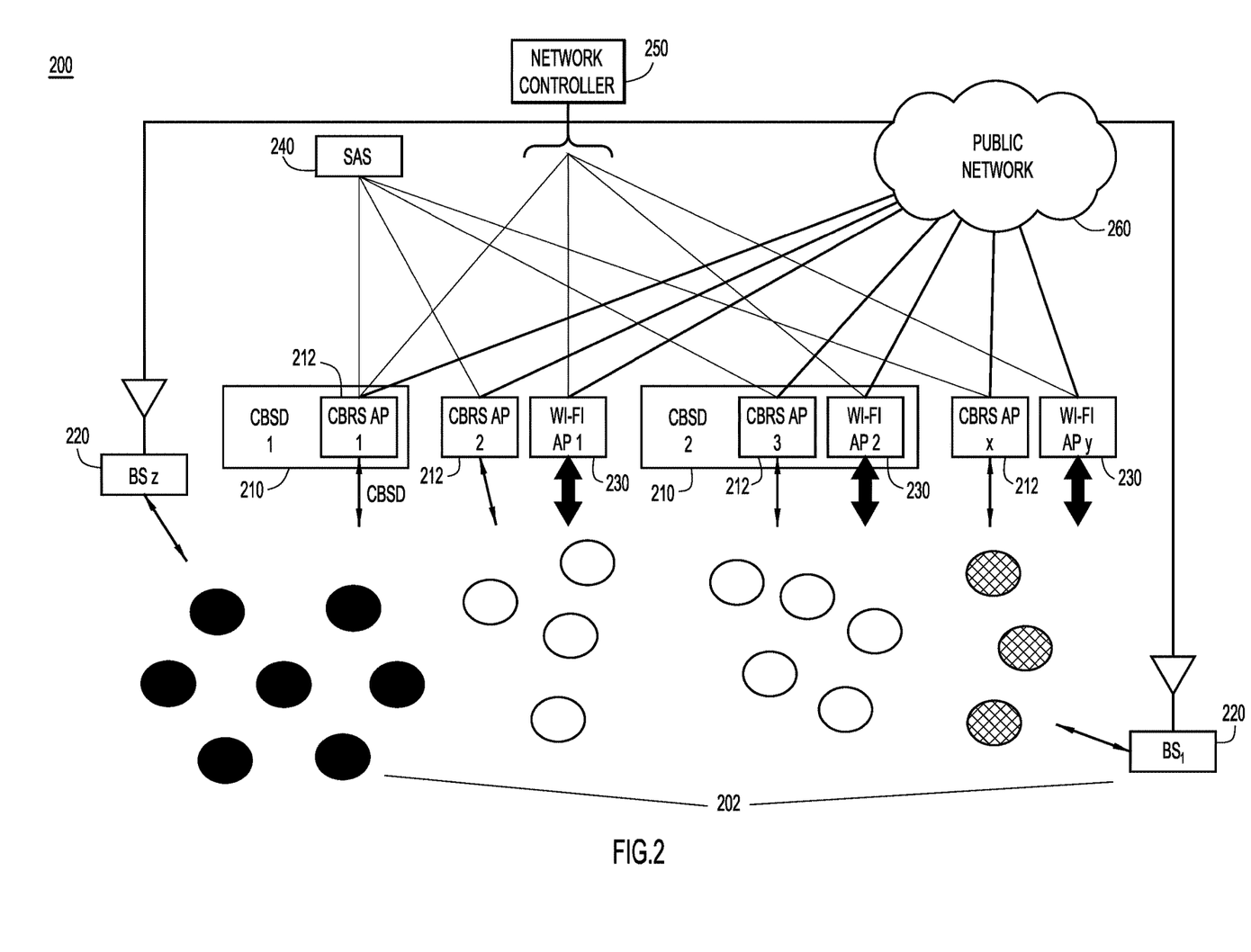
FIG. 2 is a block diagram of a network architecture for handling offloading from a private radio network, according to an example embodiment.

Turning now to FIG. 2, a block diagram of a network architecture 200 is shown that is configured to handle offloading of devices from a private radio network, according to an example embodiment. In FIG. 2, the private radio network is a CBRS network, as an example.

FIG. 2 illustrates UE devices 202 (shown as circles), CBRS devices 210 (CBSD1 and CBSD2, collectively CBSDs), base stations 220 (BS1, . . . , Bz, collectively BSs) of a public radio network, Wi-Fi access points 230 (AP1, AP2, . . . , APy, collectively Wi-Fi APs), control entities, and public network(s). Some of the CBSD devices 210 may include CBRS APs 212. The control entities include SAS 240 and a network controller 250. The CBSDs 210, BSs 220, and Wi-Fi APs 230 connect UE devices 202 to the public network 260. The public network 260 may include a public data network, such as the Internet. The number of UE devices 202, CBSDs 210, BSs 220, and Wi-Fi APs 230 is not limited to the configuration shown in FIG. 2 and is provided by way of an example only.

In FIG. 2, at least some of the UE devices 202 are CBRS-enabled and are able to connect to the public network 260 via the CBRS network. The UE devices 202 attach to the CBRS network via various CBRS access points (CBRS AP1, CBRS AP2, CBRS AP3, CBRS AP x, collectively CBRS APs) 212. Some of the CBRS APs 212 may be standalone devices such as the CBRS AP 2 and CBRS AP x, while others are integrated with other components and are part of another device such as is the case for CBRS AP 1 and CBRS AP 3. CBRS AP 1 is part of the CBSD 1 and CBRS AP 3 is part of the CBSD 2.

The CBSD 1 may also include a controller (not shown). A CBSD that includes a controller is an evolved NodeB (eNodeB), defined in a Universal Mobile Telecommunications System (UMTS) standard. The CBSD 2 may be an integrated AP device that includes the CBRS AP 3 and also a Wi-Fi AP 2.

The SAS 240 controls the CBSDs 210 and the CBRS APs 212. SAS 240 manages the CBRS spectrum and maintains a database of spectrum usage by all users, including Tier 1 users 102, Tier 2 users 104, and Tier 3 users 106 (as shown in FIG. 1), in all census tracts or areas. SAS 240 allocates channels to the CBRS APs 212 using a variety of rules. For example, SAS 240 considers multiple factors and informs the CBRS APs 212 and the CBSDs 210 of the operating parameters including allocated frequency band, allocated channel, and/or maximum effective isotropic radiated power that can be used at a given point in time. SAS 240 also provides the FCC required 300 seconds notification that an enterprise (a Tier 3—GAA User) needs to offload its UE devices 202 from the CBRS network.

When the enterprise is forced to offload its UE devices 202, the UE devices 202 may be offloaded to a cellular network provided via the BSs 220 or to a Wi-Fi access network provided via Wi-Fi APs 230. In FIG. 2, based on the 300 seconds notification, provided by the SAS 240 to the CBSD 1, a set of UE devices 202 attached to the CBRS AP 1 (shaded circles) may be offloaded from the CBRS AP 1 to the BSz, as an example. The set of the UE devices 202 continue to obtain access to the public network 260 via the BSz and are offloaded from the CBRS network. According to another example embodiment, another set of the UE devices 202 (cross hatched circles) may be offloaded to the Wi-Fi access network, provided via the Wi-Fi AP y.

Wi-Fi access points 230 are managed and controlled by the network controller 250. The network controller 250 may be a WLAN controller i.e., a wireless network controller. In one example embodiment, the network controller 250 may include an interworking function (IWK) to also manage the CBRS-APs 212 i.e., to serve as a controller for at least some of the CBRS APs 212. The network controller 250 may generate policies and push the policies to various access points for execution. For example, the network controller 250 may run analytics to develop CBRS offloading policies, as explain in further detail below. It is also possible, however, that the functions of the network controller 250 described herein may be implemented on any of the CBSD or CBRS APs shown in FIG. 2.

Figure 3:
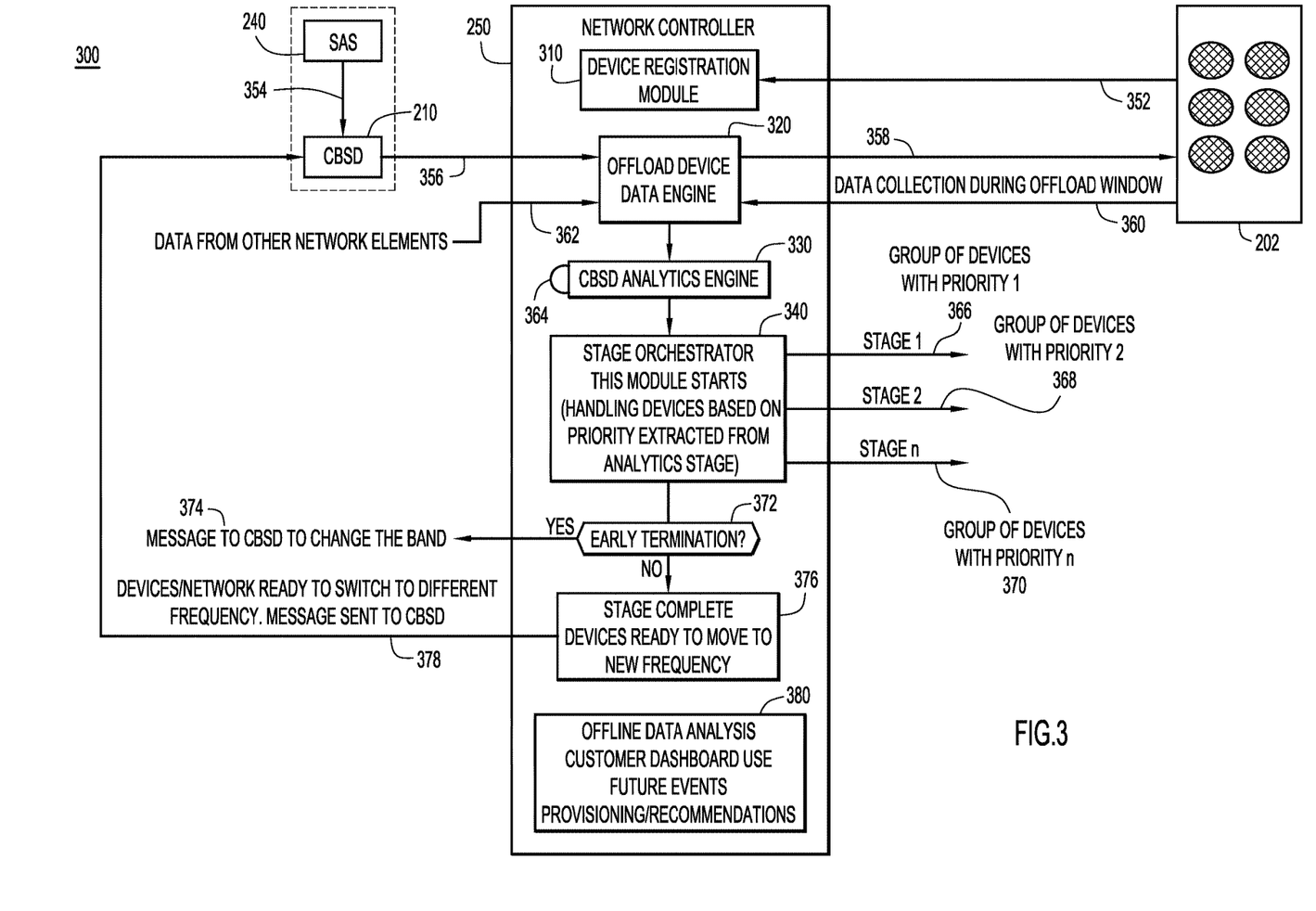
FIG. 3 is an operational flow diagram illustrating a method of orchestrating offloading from a private radio network based on impact determined to at least one performance parameter to one or more devices operating on the private radio network during offload, according to an example embodiment.

Reference is now made to FIG. 3. FIG. 3 is an operational diagram depicting a method 300 of orchestrating offloading devices from a private radio network based on impact determined to at least one performance parameter to the devices, according to an example embodiment. FIG. 3 shows the SAS 240, one of the CBSDs 210, network controller 250, and UE devices 202.

The network controller 250 includes several functional modules/engines, including a device registration module 310, an offload device data engine 320, a CBSD analytics engine 330, and a stage orchestrator 340. In an example embodiment, the device registration module 310, the offload device data engine 320, the CBSD analytics engine 330, and the stage orchestrator 340 ensure performance parameters, such as throughput and latency, during the offloading process, as explained in further detail below.

In one embodiment, the device registration module 310, the offload device data engine 320, the CBSD analytics engine 330, and the stage orchestrator 340 are software components that are implemented in the network controller 250. However, one of ordinary skill in the art may readily appreciate that these software components or modules may be implemented elsewhere, depending on various implementation details. For example, the device registration module 310, the offload device data engine 320, the CBSD analytics engine 330, and the stage orchestrator 340 may be software running in a cloud or may be software modules integrated into one or more of the CBSDs 210.

According to another example embodiment, various software modules may be implemented in various hardware devices. For example, the device registration module 310, the offload device data engine 320, the CBSD analytics engine 330 may be implemented by the network controller 250 and each of the CBSDs 210 implements the stage orchestrator 340.

In an example embodiment, based on the notification from a regulatory authority or agency, assured performance parameters for the UE devices 202 are provided during the private network offloading, by using these software modules, as detailed below.

When notified by the SAS 240 that the private radio network needs to move to a different frequency/band within 300 seconds, providing the predictability to performance of the UE devices 202 is important to ensure seamless and assured services of these UE devices 202 during the offload process. Many mission-critical systems have very strict requirements on parameters like throughput, latency, etc. and even for non-mission critical systems, understanding the behavior of these parameters helps provide assured and deterministic services during the offload process.

In FIG. 3, the network controller 250 may be in communication with the UE devices 202, for example, via APs such as the Wi-Fi APs 230 (FIG. 2). Also, the network controller 250 may be in communication with the UE devices 202 via the CBRS APs 212 (FIG. 2) that can be integrated into the CBSD 210. In various example embodiments, the UE devices 202 and other network elements (not shown) may provide various data, metrics, and key performance indicator (KPI) parameters to the network controller 250 to be considered during a handover/band change process and optionally, during normal operation, as explained in further detail below.

The device registration module 310 is an interface for registration of the UE devices 202 in the private network (e.g., CBRS network) for obtaining telemetry data. Some of the UE devices 202 may have an auto-registration mechanism, whereas other UE devices 202 may use an application interface (AP1) for the registration. At 352, the UE devices 202 in the private network register with the network controller 250. During the registration process, each of the UE devices 202 advertises its capabilities. A handshake mechanism between the network controller 250 and the respective UE devices 202 identifies data which the respective UE device can provide to the network controller 250 during the offload process. Each of the UE devices 202 provides its device specific parameters such as a device type (category and model), network capabilities, minimum required throughput, maximum allowed latencies, and so on. These specific parameters are provided by way of an example and not by way of a limitation.

In example embodiment, SAS 240 may detect a priority user for a frequency band being used by the CBSD 210. As such, SAS 240 generates an incumbent signal indicating that the CBSD 210 has 300 seconds to stop using the frequency band assigned to the CBSD 210. At 354, the incumbent signal is provided by the SAS 240 to the CBSD 210. The CBSD receives the incumbent signal and starts the offloading process. At 356, the CBSD 210 provides an offload event signal to the network controller 250.

Based on receiving the incumbent signal from the CBSD 210, the network controller 250 will execute the offload device data engine 320 to gather data from the UE devices 202. At 358, the offload device data engine 320 will provide a data collection request to each of the UE devices 202 that need to be offloaded from the CBRS network. That is, the offload device data engine 320 will identify the UE devices 202 attached to the CBSD 210, based on the prior registration at 352, and to each of the UE devices 202 identified/registered with the network controller 250, the offload device data engine 320 sends a push or a pull data collection request.

At 360, the offload device data engine 320 collects data, which includes real-time data and other important performance parameters, from each of the UE devices 202. The collected data is tagged with an appropriate index for further analysis. Real-time data and performance KPI parameters may include specific values obtained from a respective UE device such as sensor values and the current state of the respective UE device. For example, the respective UE device may indicate that it is in a middle of a financial transaction, in a middle of a data download or upload, in a middle of a communication, or is in an idle state.

In an example embodiment, the network controller 250 stores the parameters obtained by the offload device data engine 320 from the UE devices 202 during an offload window. In an example embodiment, the data gathered during the offload window or during the handover process provides key insight regarding performance during the offload process. Since the data is collected during the offload process, explicit tagging of the data with the context is useful to provide for accurate insights. That is, data collected during regular operation e.g., by the device registration module 310, may skew the offload insights because large amounts of data collected during regular operation may dominate the data collected during the offload window. Accordingly, tagging data collected during the offload process ensures that the other data does not skew the offload insights and the offload analytics are accurate.

At 362, the offload device data engine 320 also collects data from other network elements. For example, data can include telemetric values and KPI parameters, which will improve the accuracy of the analytics.

At 364, the CBSD analytics engine 330 extracts insight from the offload data and assigns priority to the devices in the network. In an example embodiment, the CBSD analytics engine 330 obtains, as input, data collected by the offload device data engine 320, at 360 and 362. The CBSD analytics engine 330 analyzes these data to determine priority rules. In an example embodiment, analysis can include simple fixed policies, statistical models, and/or machine learning (ML), as explained in further detail below. The analysis results in identifying various criteria for prioritizing the devices during an offloading process. For example, the CBSD analytics engine 330 identifies the following items: 1) range of thresholds for various performance parameters, speed, and various latencies, 2) corresponding time of impact of each parameter, and 3) parameter priority. The CBSD analytics engine 330 classifies the devices based on one or more of these three items and outputs priority rules for the UE devices 202. The priority rules are provided to the stage orchestrator 340 for handling the UE device 202 during the offloading process.

In an example embodiment, the stage orchestrator 340 facilitates offloading of the UE devices 202 from the CBRS network. In other words, the stage orchestrator 340 facilitates sequential transition (transition in stages) of the UE devices 202 from the CBRS network based on (pre-provisioned) polices about the priority. The UE devices 202 may need to perform certain functions before performance parameters are impacted and as such may be assigned a higher priority. For example, some of the UE devices 202 are prioritized based on whether they need to finish time bound tasks, such as saving states, whether they need to complete transactions with a peer or an external entity, whether they need to ensure buffers are cleared, whether they need to communicate to running applications and/or servers about the required offload so that they can adjust accordingly. In an example embodiment, the stage orchestrator 340 calculates a best possible sequence of events based on the priority, policies, or causal relationships between UE devices 202 or other network devices and communicates that sequence to the UE devices 202.

At 366 during Stage 1, the stage orchestrator 340 handles a first group of devices with the highest priority (priority 1). At 368 during Stage 2, the stage orchestrator 340 handles a second group of device with lower priority than the first group (priority 2), and continues to handle devices based on the priority such that at 370 during Stage n, the stage orchestrator 340 handles nth group of devices having the lowest priority (priority n). The stage orchestrator 340 groups the UE devices 202 into various priority groups based on various insights from the CBSD analytics engine 330 obtained using device requirements, fixed rules, statistical models, behavioral algorithms, and/or ML algorithms.

In one example embodiment, the UE devices 202 are split into different priority groups based on speed impact during the offload process and the respective device's actual speed threshold requirement. For example, if the stage orchestrator 340 determines that the speed impact is within the respective device's actual speed threshold requirement, the respective device is placed in a lower priority group (e.g., group of devices with priority n). On the other hand, if one of the UE devices 202 is identified as vulnerable during the offload process by the CBSD analytics engine 330, the stage orchestrator 340 assigns this device to a higher priority group (e.g., group of devices with priority 1) in order to help take mitigating actions. In an example embodiment, the stage orchestrator 340 can schedule work in parallel and not necessarily in sequence, unless causality is involved between entities.

When some of the UE devices 202 complete the offload process, they send an acknowledgement message back to the stage orchestrator 340. At 372, based on receiving an acknowledgement from all of the UE devices 202, the stage orchestrator 340 declares an early stage completion and at 374 transmits a message to the CBSD 210 to continue with the band/frequency change process. That is, the stage orchestrator 340 informs the CBSD 210 that all of the UE devices 202 are offloaded from the CBRS network. If an early termination is not possible (no at 372), the stage orchestrator 340 continues to wait for the acknowledgement message. When the devices are ready to move to a new frequency at 376, then at 378, the stage orchestrator 340 sends a message to the CBSD 210 indicating that the UE devices 202 are ready to switch to a different frequency or network (offloaded). In an example embodiment, the message may be generated and sent based on a predetermined timed threshold regardless of whether the acknowledgement messages have been received from all of the UE devices 202. Additionally, the stage orchestrator 340 may keep track of any issues during the stage progression.

Offline data analysis is performed at 380 when the network is not under offloading but during normal operations. The offline data analysis 380 may provide data insights using dashboards (presented on a display) and may predict or recommend any future events or provide recommendations for any new network provisioning with an assured key performance parameter. The offline data analysis 380 optimizes and predicts assured UE performance parameters and may classify the UE devices 202 during the provisioning stage.

According to one or more example embodiments, as per FCC guidelines, the system has 300 seconds to complete the offload process. The CBSD 210 waits for a notification from the network controller 250 before it proceeds with the frequency/band change unless the 300 seconds threshold has been reached. For graceful offloading, some of the UE devices 202 may need special handling. The network controller 250 provides the special handling by prioritizing these devices, thereby achieving assured performance parameters such as throughput and latency, before the frequency band is changed.

Figure 4:
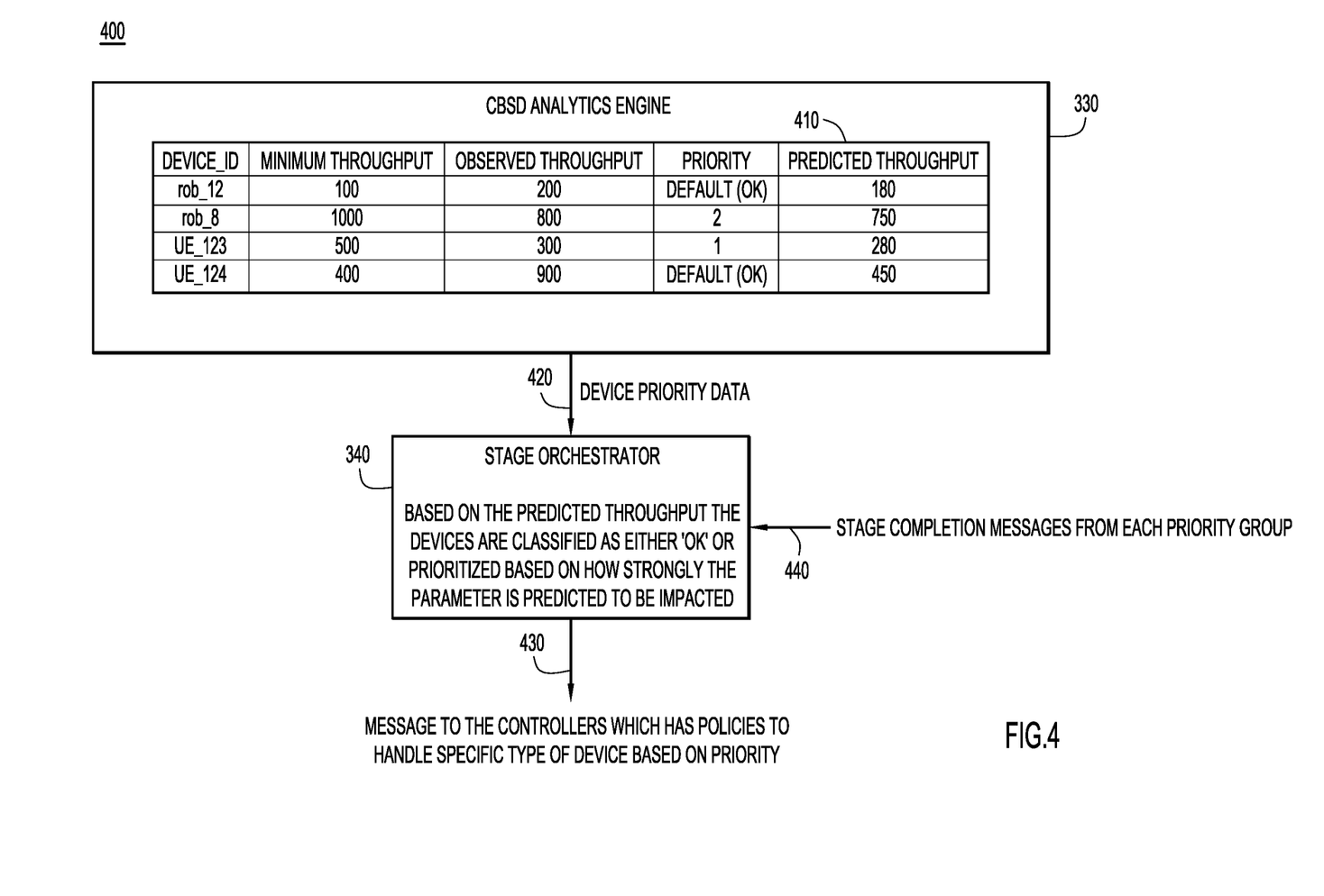
FIG. 4 is an operational flow diagram illustrating analysis data used to orchestrate offloading, according to an example embodiment.

Turning now to FIG. 4, an operational flow diagram is provided for a method 400 of using analytics data to orchestrate offloading, according to an example embodiment. The method 400 may be implemented by any network device that is executing the stage orchestrator 340 shown in FIG. 3.

The CBSD analytics engine 330 implements per device analysis to provide insight about performance parameters such as throughput, latency, etc. and impact on these parameters on the device during the offloading process i.e., offload window. FIG. 4 shows an example of analytics data 410 generated by the CBSD analytics engine 330. The analytics data 410 is depicted in the form of a table for explanatory purposes only. The analytics data 410 includes several parameters associated with each of 4 devices indicated by Device_ID, (rob_12, rob_8, UE_123 and UE_124). As an example, the parameters include minimum throughput, observed throughput, priority, and predicated throughput. The Device_ID and minimum throughput are obtained by the device registration module 310, during the registration of the respective device. The observed throughput is obtained by the offload device data engine 320 by collecting data from the respective device and/or other network elements during one or more previous offload processes. Based on the observed throughput, the CBSD analytics engine 330 estimates throughput of the device during a subsequent offload process and store the estimate as a predicted throughput. For example, the CBSD analytics engine 330 can average the observed throughput from the previous offload processes to estimate the predicted throughput. As an alternative, the CBSD analytics engine 330 may apply sophisticated statistical analysis and/or ML algorithms to obtain a more accurate predicted throughput based on an actual state of the device. Various techniques may be applied to obtain predicted throughput.

In an example embodiment, the CBSD analytics engine 330 then assigns a priority to the device based on a comparison between the predicated throughput and the minimum throughput of the respective device. In an example embodiment, predetermined thresholds may be established to assign devices to various priority groups or categories. By way of an example, the categories may include a first category in which the predicted throughput is sufficient (default priority), a second category in which the predicted throughput is less than the minimum required throughput by 30% or less, a third category in which the predicted throughput is less than the minimum required throughput by 50% but more than 30%, and so on.

For example, in the analytics data 410, a first device "rob_12" has a minimum throughput of 100, an observed throughput of 200, and a predicted throughput of 180. Since the predicted throughput is above the minimum throughput requirement of the device, the CBSD analytics engine 330 sets the priority as default. A second device "rob_8" had a minimum throughput of 1000, an observed throughput of 800, and a predicted throughput of 750. For the second device, the predicted throughput is below the required minimum throughput. Accordingly, special handling is needed for this device. In FIG. 4, since the predicted throughput is somewhat close to the minimum throughput (less than 30%), the second device is assigned to a medium/moderate priority, priority 2. A third device "UE_123" has a minimum throughput of 500, an Observed throughput of 300, and a predicted throughput of 280. For the third device, the predicted throughput is below the required minimum throughput. Accordingly, special handling is needed for rob_8. Since the predicted throughput for UE_123 is more than 30% below the required minimum throughput, the third device is assigned the highest priority, priority 1. A fourth device "UE-124" has a minimum throughput of 400, an observed throughput of 900, and a predicted throughput of 450. Since the predicted throughput of this device is above the minimum throughput requirement of the device, the CBSD analytics engine 330 sets the priority as default indicating that no special handling of the device is needed for UE_124.

At 420, the device priority data is then communicated to the stage orchestrator 340. In an example embodiment, the CBSD analytics engine 330 provides the stage orchestrator 340 with the device identifiers (Device_ID) and the corresponding priority. In another example embodiment, the CBSD analytics engine 330 provides the estimated throughput of the devices and the rules for setting the priority of the devices and the stage orchestrator 340 may determine the priority for each of the devices. That is, based on the predicted throughput and the minimum throughput provided by the CBSD analytics engine 330, the stage orchestrator 340 may classify each of the devices in one of the priority levels/groups. The devices are classified in a default category (lowest priority) or the higher priority (priority 2 or priority group) depending on how strongly the parameter is predicted to be impacted. At 430, the stage orchestrator 340 generates and transmits messages to the CBSD controllers and/or CBSD APs, providing instructions or policies on how to handle the UE devices. In an example embodiment, the CBSD controllers and/or CBSD APs implement policies to handle a specific type of device based on the assigned priority.

According to an example embodiment, the stage orchestrator 340 may handle the offload process sequentially in stages, starting with the devices having the highest priority (priority 1), and finishing with the devices having the lowest priority (default priority). At 440, the stage orchestrator 340 receives stage completion messages from each priority group. That is, based on acknowledgement messages from various devices indicating that they have moved from the CBRS, the stage orchestrator 340 determines whether a certain stage is complete i.e., all devices within a certain priority group have been offloaded. Once all stages are completed, the stage orchestrator 340 can send a completion message to the CBSD indicating that all of the UE devices have been offloaded.

FIG. 4 is provided by way of an example and not by way of a limitation. In one or more example embodiments, other performance parameters may be similarly analyzed during the offload window and a combination of parameters may be used to generate offload priority for the UE devices.

According to one or more example embodiments, a regression model and/or time series analysis can be applied by the CBSD analytics engine 330 to predict throughput or other performance parameters in a CBRS private network. This information is also used to assign priorities and further classify the UE devices for orchestration. For example, UE devices may operate in a diverse environment and generate data with high variances. In this case, implementing a fixed rule-based software solution may be inefficient in capturing data variance during the offloading process. Accordingly, advanced ML algorithms for more complex data analysis can be used. On the other hand, for networks with LIE devices exhibiting little variations, policy-based implementation may be sufficient.

In an example embodiment, if the ML algorithm is applied to extract insights from the gathered data, then the CBSD analytics engine 330 classifies the UE devices in well-defined threshold, speed, and/or latency fluctuation categories. The CBSD analytics engine 330 may further classify the UE devices based on time series analysis of the data to extract any seasonal patterns during the offload process. Time series analysis helps in predicting thresholds similar to regression models but for the data which shows temporal variations. For classification, algorithms such as Support Vector Machine (SVM), Decision Trees, Neural Networks, and so on are used. The CBSD analytics engine 330 may apply regression models to predict future thresholds, speed, and latency requirements. As explained above, by applying one or more of these ML algorithms, the CBSD analytics engine 330 generates priority rules (rules to identify the priority) for use in sequencing devices during an offload process, as well as during the transition and any post-transition actions that may need to be taken. In another example embodiment, the CBSD analytics engine 330 resides in a cloud i.e., the analytics and orchestrator are pushed to the cloud apart from a network controller.

In one or more example embodiments, various factors (and combinations of these factors) may account for fluctuations in throughput and increased latencies and may be taken into account in generating the priority rules. Some examples of these factors include: (1) category and model of LIE devices, CBSD, and other network dements, (2) a number of the UE, devices attached to a network element at any given point of time, (3) mode of operation of these devices (low power mode, etc.), (4) type of data being transmitted (video, audio, sensor data, telemetry data, etc.), (5) characteristics or attributes of internal hardware components used in the UE devices, (6) different combinations of offload frequencies, (7) environmental factors in which the devices are operating (interference, weather, etc.). For example, industrial IoT devices may operate in harsh environments (extremely low or high temperatures, exposure to electromagnetic radiation, etc.), thereby impacting operation of the hardware components of these IoT devices. Additional factors may include: (8) operational patterns of these devices during different times or days of the week, (9) latencies at different parts of the network, and (10) power variations under which the UE device operates. These are a few examples of various factors that may directly or indirectly impact operations of the UE devices during the offloading process. Accordingly, the CBSD analytics engine 330 may account for one or more of these factors and their impact on one or more performance parameters of the UE devices in generating the priority rules for the offload process.

According to various example embodiments, deterministic behavior of the UE devices during the offload process is identified and accounted for during the offload process. Further, the UE devices are protected from losing state or any critical functionality due to degraded performance during the offload process. According to various example embodiments, recommendations with assured performance parameters are provisioned for the offloading process. Graceful and secure offloading process is ensured for the UE devices with an optional auto recovery feature based on the generated insights. For example, the UE devices may buffer data during the offloading process and recover the data from the buffer after the offloading process is complete (when operating in another network). In various example embodiments, devices vulnerable to performance degradation during the offload window are identified and prioritized to assure performance of these devices.

Figure 5:
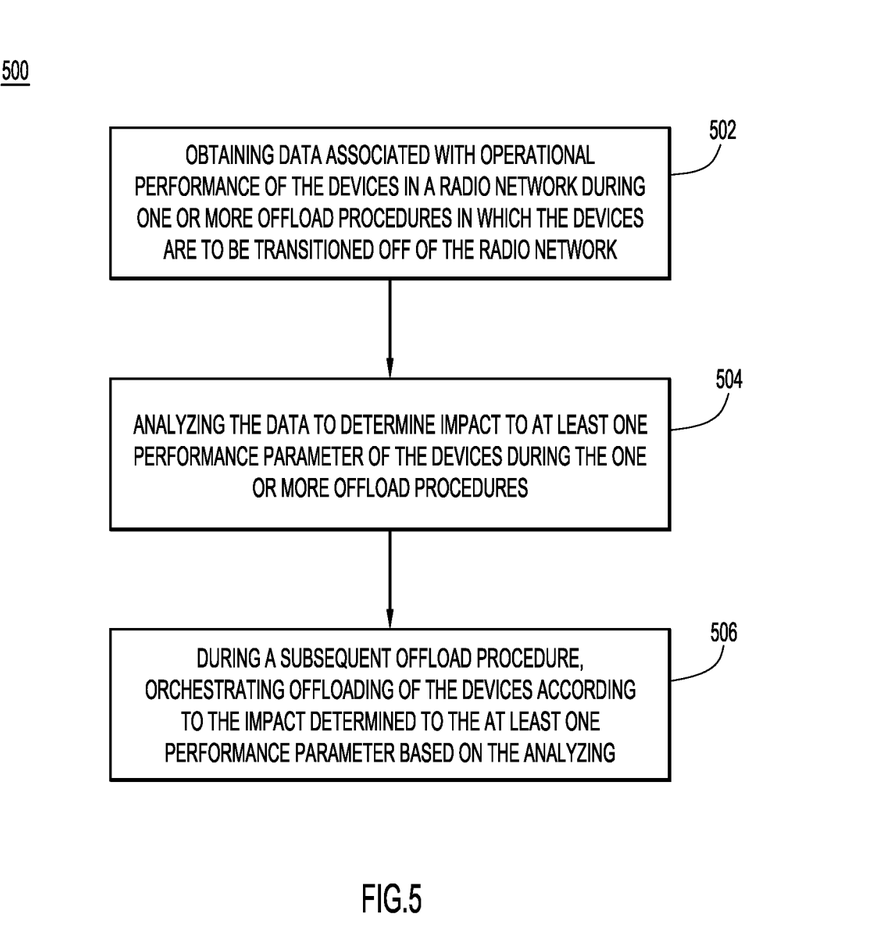
FIG. 5 is a flowchart illustrating an overall method of orchestrating offloading of the devices from a private network, according to an example embodiment.

FIG. 5 is a flowchart illustrating a method 500 of orchestrating offloading of the devices, according to an example embodiment. The method 500 may be executed at a network controller that is in communication with at least one access point wirelessly communicating with devices operating in a radio network. At 502, the network controller obtains data associated with operational performance of the devices in the radio network during one or more offload procedures in which the devices are to be transitioned off of the radio network. At 504, the network controller analyzes the data to determine impact to at least one performance parameter of the devices during the one or more offload procedures. At 506, during a subsequent offload procedure, the network controller orchestrates offloading of the devices according to the impact determined to the at least one performance parameter based on the analyzing operation 504.

According to one or more example embodiments, the analyzing operation 504 includes generating a priority sequence for the offloading of the devices.

According to one or more example embodiments, the analyzing operation 504 includes performing one or more of: machine learning to classify the devices based on at least one of a threshold, speed, or latency, performing time series analysis of the data to extract patterns during the one or more offload procedures, or applying regression models to predict a future threshold, future speed, and future latency requirements.

According to one or more example embodiments, the orchestrating operation 506 includes prioritizing a first device from among the devices based on the at least one performance parameter of the first device indicating performance degradation during the offloading.

According to one or more example embodiments, the prioritizing the first device includes prioritizing the first device based on the at least one performance parameter of the first device determined to be lower than a minimum value.

According to one or more example embodiments, the method further includes obtaining, by the network controller, attribute data for each of the devices. The attribute data including one or more operational attributes of the devices. The method further includes analyzing, by the network controller, the attribute data to determine the at least one performance parameter, the at least one performance parameter including at least one of throughput or latency.

According to one or more example embodiments, the obtaining the attribute data is performed during registration of the devices with the radio network and the obtaining the data associated with the operational performance of the devices includes obtaining telemetric data and key performance indicators (KPI) from the devices during the one or more offload procedures.

According to one or more example embodiments, the analyzing operation 504 includes: estimating the at least one performance parameter expected during the one or more offload procedures for the devices based on the attribute data, the telemetric data and the key performance indicators and assigning priority to the devices based on the at least one performance parameter expected during the offloading.

According to one or more example embodiments, the orchestrating operation 506 includes offloading the devices in at least two stages based on the priority such that time bound tasks are completed and transactions with peer devices are completed, and based on causal relationships between the devices.

According to one or more example embodiments, the method further includes notifying, a network device, of a completion of the orchestrating based on receiving an acknowledgement from each of the devices.

Figure 6:
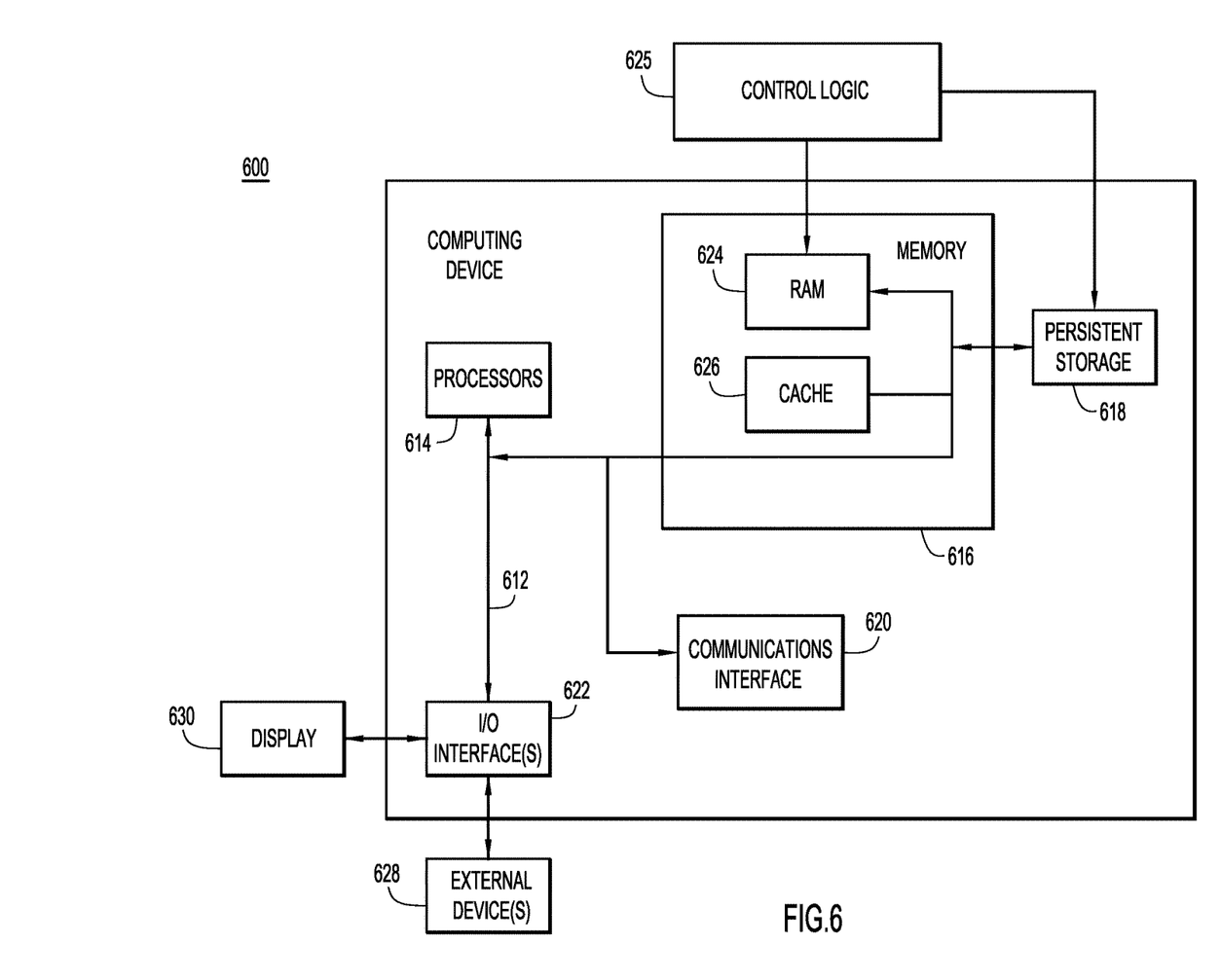
FIG. 6 is a hardware block diagram of a computing device configured to orchestrate the offloading, according to various example embodiments.

FIG. 6 is a hardware block diagram of a computing device 600 configured to perform the functions of a device that performs the operations described herein in connection with FIGS. 2-5, according to various example embodiments. In one example, the computing device 600 is generally representative of the network controller 250 referred to herein. It should be appreciated that FIG. 6 provides only an illustration of various embodiments and does not imply any limitations with regard to the environments in which different embodiments may be implemented. Many modifications to the depicted environment may be made.

As depicted, the computing device 600 includes a bus 612, which provides communications between computer processor(s) 614, a memory 616, a persistent storage 618, communications unit 620, and input/output (I/O) interface(s) 622. The bus 612 can be implemented with any architecture designed for passing data and/or control information between processors (such as microprocessors, communications and network processors, etc.), system memory, peripheral devices, and any other hardware components within a system. For example, the bus 612 can be implemented with one or more buses.

The memory 616 and persistent storage 618 are computer readable storage media. In the depicted embodiment, the memory 616 includes a random access memory (RAM) 624 and a cache (cache memory) 626. In general, the memory 616 can include any suitable volatile or non-volatile computer readable storage media that stores instructions for the control logic 625.

The control logic 625 includes instructions that, when executed by the processor(s) 614, cause the computing device 600 to perform one or more of the methods described herein, including obtaining data associated with operational performance of devices in a radio network during one or more offload procedures in which the devices are to be transitioned off of the radio network, analyzing the data to determine impact to at least one performance parameter of the devices during the one or more offload procedures, and during a subsequent offload procedure, orchestrating offloading of the devices according to the impact determined to the at least one performance parameter based on the analyzing. The control logic 625 may be stored in the memory 616 or the persistent storage 618 for execution by the computer processor(s) 614.

One or more programs may be stored in persistent storage 618 for execution by one or more of the respective computer processors 614 via one or more memories of memory 616. The persistent storage 618 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by the persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

The communications unit 620, in these examples, provides for communications with other data processing systems or devices. In these examples, communications unit 620 includes one or more network interface cards. Communications unit 620 may provide communications through the use of either or both physical (wired) and wireless communications links.

The I/O interface(s) 622 allows for input and output of data with other devices that may be connected to the computing device 600. For example, the I/O interface 622 may provide a connection to external devices 628 such as a keyboard, keypad, a touch screen, and/or some other suitable input device. External devices 628 can also include portable computer readable storage media such as database systems, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. The display 630 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing system employed by the present embodiments may be implemented by any personal or other type of computer or processing system (e.g., desktop, laptop, personal data assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, wireless access network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The present embodiments may employ any number of any type of user interface (e.g., Graphical User Interface (GUI), command-line, prompt, etc.) for obtaining or providing information (e.g., data relating to providing enhanced delivery options), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In still another embodiment, a network controller (an apparatus) is provided that includes a communication interface configured to enable network communications, a memory configured to store executable instructions, and a processor coupled to the communication interface and the memory and configured to perform operations. The operations include obtaining data associated with operational performance of devices in a radio network during one or more offload procedures in which the devices are to be transitioned off of the radio network, analyzing the data to determine impact to at least one performance parameter of the devices during the one or more offload procedures, and during a subsequent offload procedure, orchestrating offloading of the devices according to the impact determined to the at least one performance parameter based on the analyzing.

According to one or more example embodiments, the processor is configured to perform the analyzing by generating a priority sequence for the offloading of the devices.

According to one or more example embodiments, the processor is configured to perform the analyzing by performing one or more of: machine learning to classify the devices based on at least one of threshold, speed, and latency, performing time series analysis of the data to extract patterns during the one or more offload procedures, or applying regression models to predict a future threshold, future speed, and future latency requirements.

According to one or more example embodiments, the processor is configured to perform the orchestrating by prioritizing a first device from among the devices based on the at least one performance parameter of the first device indicating performance degradation during the offloading.

According to one or more example embodiments, the processor is configured to perform the prioritizing by prioritizing the first device based on the at least one performance parameter of the first device determined to be lower than a minimum value.

According to one or more example embodiments, the processor is configured to perform the operations including: obtaining attribute data for each of the devices, the attribute data including one or more operational attributes of the devices, and analyzing the attribute data to determine the at least one performance parameter. The at least one performance parameter includes at least one of throughput or latency.

According to one or more example embodiments, the processor is configured to perform the obtaining the attribute data during registration of the devices with the radio network. The attribute data includes for each of the devices, a device identifier and at least one of a model, a category, or hardware characteristics.

According to one or more example embodiments, the processor is configured to perform the obtaining of the attribute data during the one or more offload procedures. The one or more operational attributes of the device are associated with an operational performance of the devices and includes telemetric data and key performance indicators (KPI) from the devices during the one or more offload procedures.

According to one or more example embodiments, the processor is configured to perform the analyzing of the data to determine the at least one performance parameter by: estimating the at least one performance parameter expected during the one or more offload procedures for the devices based on the attribute data, the telemetric data, and the key performance indicators and assigning priority to the devices based on the at least one performance parameter expected during the offloading.

[moo] In yet another embodiment, one or more non-transitory computer readable storage media encoded with instructions are provided. When the media is executed by a processor, they cause the processor to execute a method. The method includes obtaining data associated with operational performance of devices in a radio network during one or more offload procedures in which the devices are to be transitioned off of the radio network, analyzing the data to determine impact to at least one performance parameter of the devices during the one or more offload procedures, and during a subsequent offload procedure, orchestrating offloading of the devices according to the impact determined to the at least one performance parameter based on the analyzing.

[mot] The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a network controller that is in communication with at least one access point wirelessly communicating with devices operating in a radio network:
   obtaining data associated with operational performance of the devices in the radio network during one or more offload procedures in which the devices are to be transitioned off of the radio network;
   analyzing the data to determine impact to at least one performance parameter of the devices during the one or more offload procedures; and
   during a subsequent offload procedure, orchestrating offloading of the devices according to the impact determined to the at least one performance parameter and in at least two stages based on one or more policies about priority and/or causal relationships between the devices wherein orchestrating the offloading includes prioritizing at least one of the devices that needs to perform at least one function prior to the offloading, the at least one function including completing a time bound task or a transaction.

2. The method of claim 1, wherein the analyzing includes generating a priority sequence for the offloading of the devices.

3. The method of claim 2, wherein the analyzing includes performing one or more of:
   machine learning to classify the devices based on at least one of a threshold, speed, or latency;
   performing at least one of time series analysis of the data to extract patterns during the one or more offload procedures; or applying one or more neural networks or applying one or more regression models to predict a future threshold, future speed, and future latency requirements.

4. The method of claim 3, wherein the orchestrating the offloading includes prioritizing a first device from among the devices based on the at least one performance parameter of the first device indicating performance degradation during the offloading.

5. The method of claim 4, wherein the prioritizing the first device includes prioritizing the first device based on the at least one performance parameter of the first device determined to be lower than a minimum value.

6. The method of claim 1, further comprising:
obtaining, by the network controller, attribute data for each of the devices, the attribute data including one or more operational attributes of the devices; and
analyzing, by the network controller, the attribute data to determine the at least one performance parameter, the at least one performance parameter including at least one of throughput or latency.

7. The method of claim 6, wherein:
the obtaining the attribute data is performed during registration of the devices with the radio network, and
the obtaining the data associated with the operational attributes of the devices includes obtaining telemetric data and key performance indicators (KPI) from the devices during the one or more offload procedures.

8. The method of claim 7, wherein the analyzing of the data to determine the at least one performance parameter includes:
estimating the at least one performance parameter expected during the one or more offload procedures for the devices based on the attribute data, the telemetric data and the key performance indicators; and
assigning the devices to one of the at least two stages based on the at least one performance parameter expected during offloading and based on the one or more policies about the priority.

9. The method of claim 8, wherein the orchestrating includes offloading the devices in the at least two stages based on the priority such that time bound tasks are completed and transactions with peer devices are completed, and based on the causal relationships between the devices.

10. The method of claim 9, further comprising:
notifying, a network device, of a completion of the orchestrating based on receiving an acknowledgement from each of the devices.

11. An apparatus comprising:
a communication interface configured to enable network communications on a network;
a memory configured to store executable instructions; and
a processor coupled to the communication interface and the memory and configured to perform operations including:
obtaining data associated with operational performance of devices in a radio network during one or more offload procedures in which the devices are to be transitioned off of the radio network;
analyzing the data to determine impact to at least one performance parameter of the devices during the one or more offload procedures; and
during a subsequent offload procedure, orchestrating offloading of the devices according to the impact determined to the at least one performance parameter and in at least two stages based on one or more policies about priority and/or causal relationships between the devices, wherein orchestrating the offloading includes prioritizing at least one of the devices that needs to perform at least one function prior to the offloading, the at least one function including completing a time bound task or a transaction.

12. The apparatus of claim 11, wherein the processor is configured to perform the analyzing by generating a priority sequence for the offloading of the devices.

13. The apparatus of claim 12, wherein the processor is configured to perform the analyzing by performing one or more of:
machine learning to classify the devices based on at least one of threshold, speed, and latency;
performing time series analysis of the data to extract patterns during the one or more offload procedures; or
applying regression models to predict a future threshold, future speed, and future latency requirements.

14. The apparatus of claim 13, wherein the processor is configured to perform the orchestrating by prioritizing a first device from among the devices based on the at least one performance parameter of the first device indicating performance degradation during the offloading.

15. The apparatus of claim 14, wherein the processor is configured to prioritize the first device based on the at least one performance parameter of the first device determined to be lower than a minimum value.

16. The apparatus of claim 11, wherein the processor is further configured to perform operations including:
obtaining attribute data for each of the devices, the attribute data including one or more operational attributes of the devices; and
analyzing the attribute data to determine the at least one performance parameter, the at least one performance parameter including at least one of throughput or latency.

17. One or more non-transitory computer readable storage media encoded with instructions that, when executed by a processor, cause the processor to execute a method comprising:
obtaining data associated with operational performance of devices in a radio network during one or more offload procedures in which the devices are to be transitioned off of the radio network;
analyzing the data to determine impact to at least one performance parameter of the devices during the one or more offload procedures; and
during a subsequent offload procedure, orchestrating offloading of the devices according to the impact determined to the at least one performance parameter and in at least two stages based on one or more policies about priority and/or based on causal relationships between the devices, wherein orchestrating the offloading includes prioritizing at least one of the devices that needs to perform at least one function prior to the offloading, the at least one function including completing a time bound task or a transaction.

18. The one or more non-transitory computer readable storage media of claim 17, wherein the analyzing the data includes generating a priority sequence for the offloading of the devices.

19. The one or more non-transitory computer readable storage media of claim 18, wherein the analyzing includes one or more of:
machine learning to classify the devices based on at least one of threshold, speed, and latency;
performing time series analysis of the data to extract patterns during the one or more offload procedures; or applying regression models to predict a future threshold, future speed, and future latency requirements.

20. The one or more non-transitory computer readable storage media of claim 17, wherein the instructions further cause the processor to execute additional operations comprising:
- obtaining attribute data for each of the devices, the attribute data including one or more operational attributes of the devices; and
- analyzing the attribute data to determine the at least one performance parameter, the at least one performance parameter including at least one of throughput or latency.

* * * * *